United States Patent [19]

Berryhill

[11] Patent Number: 5,790,017
[45] Date of Patent: Aug. 4, 1998

[54] VEHICLE TURN SIGNAL CONTROL SYSTEM AND METHOD

[76] Inventor: Paul J. Berryhill, 415 Homecrest, Sunset Hills, Mo. 63127

[21] Appl. No.: 920,068

[22] Filed: Aug. 26, 1997

Related U.S. Application Data

[60] Provisional application No. 60/024,594 Aug. 26, 1996.

[51] Int. Cl.[6] ........................................ B60Q 1/34
[52] U.S. Cl. .................. 340/475; 340/474; 340/475; 340/476; 340/477
[58] Field of Search .................... 340/475, 477, 340/476, 474, 478; 200/61.27, 61.32

[56] References Cited

U.S. PATENT DOCUMENTS

| | | | |
|---|---|---|---|
| 3,396,367 | 8/1968 | Lohse | 340/475 |
| 3,949,361 | 4/1976 | Replogle | 340/464 |
| 3,955,175 | 5/1976 | Holt | 370/476 |
| 4,254,397 | 3/1981 | Shannon | 340/475 |
| 4,302,748 | 11/1981 | Gant | 340/475 |
| 4,348,655 | 9/1982 | Goertler et al. | 340/475 |
| 4,595,978 | 6/1986 | Sheffield | 364/141 |
| 4,684,918 | 8/1987 | Solomon | 340/476 |
| 4,962,366 | 10/1990 | Hatanaka et al. | 340/476 |
| 5,260,685 | 11/1993 | Parker | 340/477 |
| 5,414,407 | 5/1995 | Gerrans et al. | 340/475 |
| 5,438,314 | 8/1995 | Evans | 340/477 |
| 5,455,558 | 10/1995 | Gregory | 340/474 |
| 5,486,809 | 1/1996 | Wadlington, Jr. | 340/477 |
| 5,528,218 | 6/1996 | Rigsby | 340/475 |
| 5,581,235 | 12/1996 | Hollstein | 340/477 |
| 5,673,019 | 9/1997 | Dantoni | 340/475 |

OTHER PUBLICATIONS

Robin Frames, A New Wrinkle In Lane Changing, Albuquerque Journal, p. 4, Jan. 20, 1997.

*Primary Examiner*—Jeffery A. Hofsass
*Assistant Examiner*—Toan N. Pham
*Attorney, Agent, or Firm*—Polster, Lieder, Woodruff & Lucchesi, L.C.

[57] ABSTRACT

A vehicle turn signal indicator control system for left and right turn signals in which the turn signal lever has three positions, on, off and intermediate. The system has circuitry that controls the number of pulses flashed by the left or right indicator lights when the signal lever is in intermediate position and automatically returns the lever to its off position after the predetermined number of pulses have flashed.

The system includes a turn signal lever, a dip switch with at least two dual position toggle switches and control circuitry for energizing the signal indicators based on the position of the turn signal lever and the toggle switches.

14 Claims, 8 Drawing Sheets

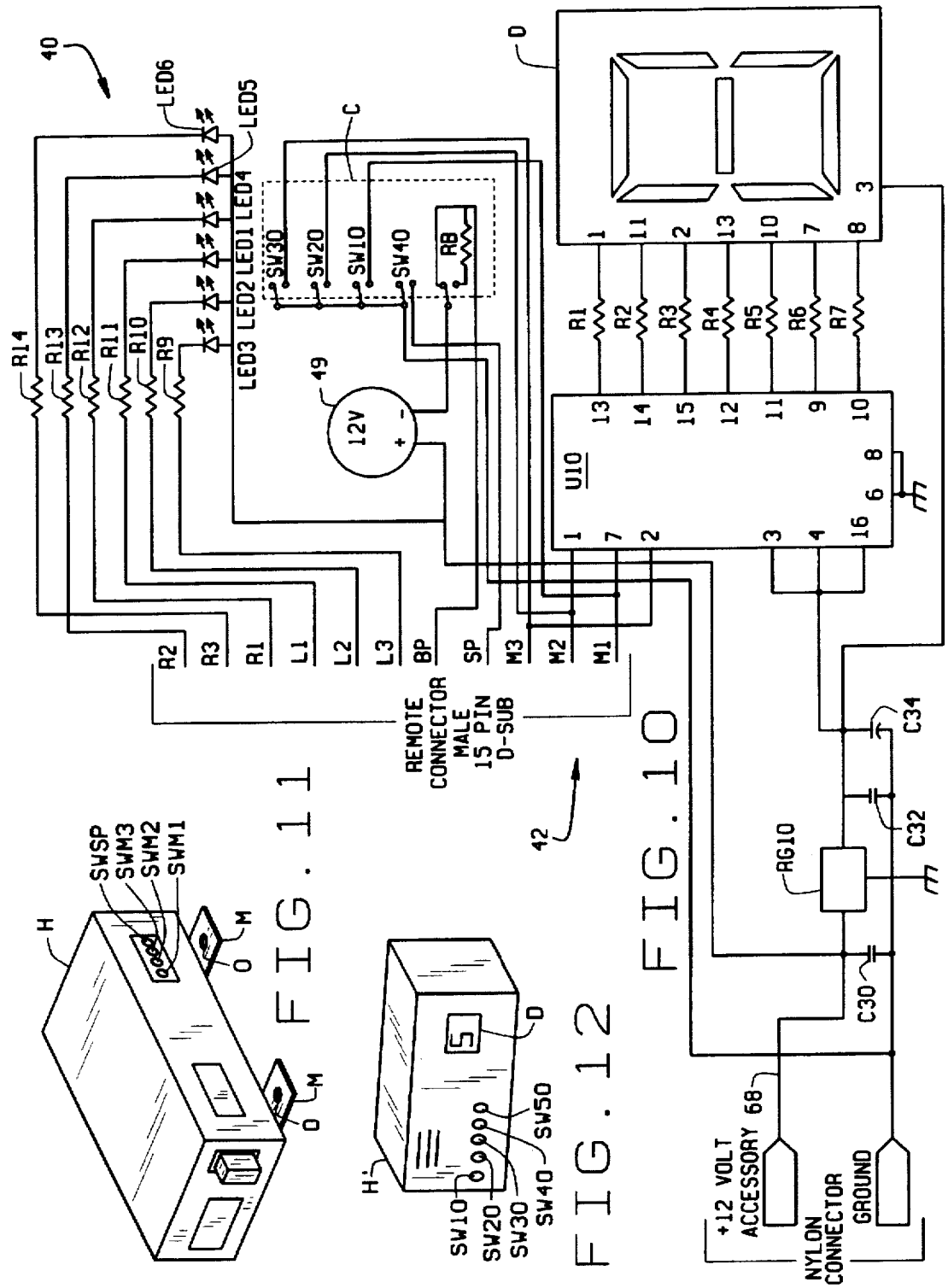

FLASH TABLE

ALL EXAMPLES ARE SHOWN USING RIGHT TURN SIGNALS

PIN 23 - R1
PIN 24 - R3
PIN 25 - R2

FIG. 13

| Mode | SWM1 | SWM2 | SWM3 | SPD |
|---|---|---|---|---|
| 0-STANDARD | DN | DN | DN | SPD-UP/DN |
| 1-SINGLE | UP | DN | DN | SPD-UP/DN |
| *2-DOUBLE | DN | UP | DN | SPD-UP/DN |
| 3-TRIPLE | UP | UP | DN | SPD-UP/DN |
| 4-REBOUND | DN | DN | UP | SPD-UP/DN |
| *5-"DEMO 1" | UP | DN | UP | SPD-UP/DN |
| 6-COUGAR | DN | UP | UP | SPD-UP/DN |

VEHICLE TURN SIGNAL CONTROL SYSTEM AND METHOD

CROSS-REFERENCE TO RELATED APPLICATIONS

This application claims priority under 35 U.S.C. § 119(e) to my copending provisional application, Ser. No. 60/024,594, filed Aug. 26, 1996.

BACKGROUND OF THE INVENTION

This invention relates to vehicles such as automobiles and motor cycles, and in particular to a control system for providing operational control of visual indicators or light bulbs associated with a vehicle turn signal. This invention allows for an operator to selectively control the number of times the turn signal flashes by pressing a conventional turn signal lever associated with a vehicle into either a permanent or intermediate position. By tapping or momentarily moving the lever in the intermediate position several times, the operator can control the number of times the turn signal flashes.

As will be appreciated by those familiar with the operation of conventional vehicle turn signals, turn signals generally are located on the right and left sides of the vehicle near the front and rear. When the operator wishes to move the vehicle in the right or left direction (e.g., to change traffic lanes or steer the vehicle around a corner at an intersection), the operator can activate the turn signals by pressing on a turn signal lever such that the signals on either the right or left side of the vehicle flash based upon the anticipated movement of the vehicle. As is generally known by those skilled in the operation of vehicles, the operator presses the turn signal lever upwardly to activate the turn signals on the right-hand side of the vehicle, and presses the lever downwardly to activate the turn signals on the left-hand side of the vehicle.

In general, the turn signal lever has a first latched or permanent position and a first intermediate position for energizing the right-hand side indicators, and a second latched or permanent position and a second intermediate position for energizing the left-hand side indicators. The lever also has a deactivated or unlatched position in which the turn signal indicators are deactivated and do not flash. The operator can move the lever into the latched position when it is desired to have the turn signal flash repeatedly until the vehicle is steered in the direction indicated by the turn signal. After completing the turn, the lever may return automatically to the deactivated position, thereby deenergizing the turn signal. In the prior art, the intermediate position allows the user to press the lever into the intermediate position (between the latched position and the deactivated position) to cause the turn signal to flash as long as the lever is held that position by the operator. When the operator releases the lever from the intermediate position, the lever returns to the deactivated position automatically.

However, this conventional turn signal system has several drawbacks and disadvantages. For example, the turn signal lever may not return from the latched position to the deactivated position after the vehicle is steered in the appropriate direction indicated by the flashing turn signals. In this situation, the operator must notice that the turn signal is still flashing after the turn is completed, and then manually move the lever into the deactivated position to stop the blinking of the indicators. If the operator fails to observe the flashing indicator, the turn signal continues flashing as the operator drives along the road. This unintentional use of the turn signal poses a threat to public safety. Other drivers on the road and pedestrians often are confused by the movements of the vehicle while the turn signal is flashing. Such observers may misinterpret the intentions of the operator driving the vehicle with the flashing indicators, and take actions which endanger themselves or others based upon an incorrect belief that the vehicle is turning or changing lanes.

Therefore, it is desirable to develop a turn signal system that allows for the user to activate the turn signal to flash a predetermined number of times by momentarily holding the turn signal lever in the intermediate position (e.g., for not longer than one flash). For example, this system could be configured such that the turn signals will be activated for a predetermined amount of flashes if the lever is held in the intermediate position for a period of time less than the time interval necessary to complete the first flash. This ensures that the lever automatically returns to the deactivated position after the turn signal is activated, thereby preventing continued flashing of the turn signal after the predetermined number of flashes has expired. Such a system also should allow for operation of the turn signals by placing the lever in the latched position, if desired. This will allow the turn signals to operate until the lever is in the deactivated position.

Another disadvantage associated with prior art turn signals is that repeated and continued movement of the turn signal lever into the latched position wears on a turn signal switch latch mechanism associated with the turn signal system, thereby increasing the risk of failure of the latch mechanism and turn signal system. Therefore, it is desirable to develop a turn signal system that helps extend the life of the turn signal switch latch mechanism by providing the operator with an alternative manner to activate the turning signals for an extended period of time without pressing the lever into the latched position. Such a system preferably allows the operator to cause the turn signals to flash a predetermined number of times by holding the lever in the intermediate position for a brief time interval.

Accordingly, several objects of the present invention include providing a new and improved vehicle turn signal control system that is convenient and easy to use; helps prevent turn signals from being left on accidentally while driving; and extends the life of the turn signal switch latch mechanism. Due to the ease of operation of the control system, vehicle operators may tend to use turn signals more often, resulting in improved driving and traffic safety. Under normal driving conditions, the control system out lasts conventional flasher devices because the control system has no contacts or bimetallic element similar to those present in conventional devices that wear out and fail. These and other objects and advantages will become apparent to those skilled in the art in light of the following disclosure and accompanying drawings.

BRIEF DESCRIPTION OF THE DRAWINGS

The objects of the invention are achieved as set forth in the illustrative embodiments shown in the drawings which form a part of the specification.

FIG. 10 is a schematic diagram of circuitry associated with the remote control unit;

FIG. 11 is a perspective view of a housing used to contain the control circuitry of the third embodiment of the present invention;

FIG. 12 is a perspective view of a housing used to contain the remote control unit circuitry; and FIG. 13 is a flash table showing outputs of a microprocessor associated with the third embodiment based upon positioning of toggle switches.

DESCRIPTION OF THE PREFERRED EMBODIMENT

Figure 1:
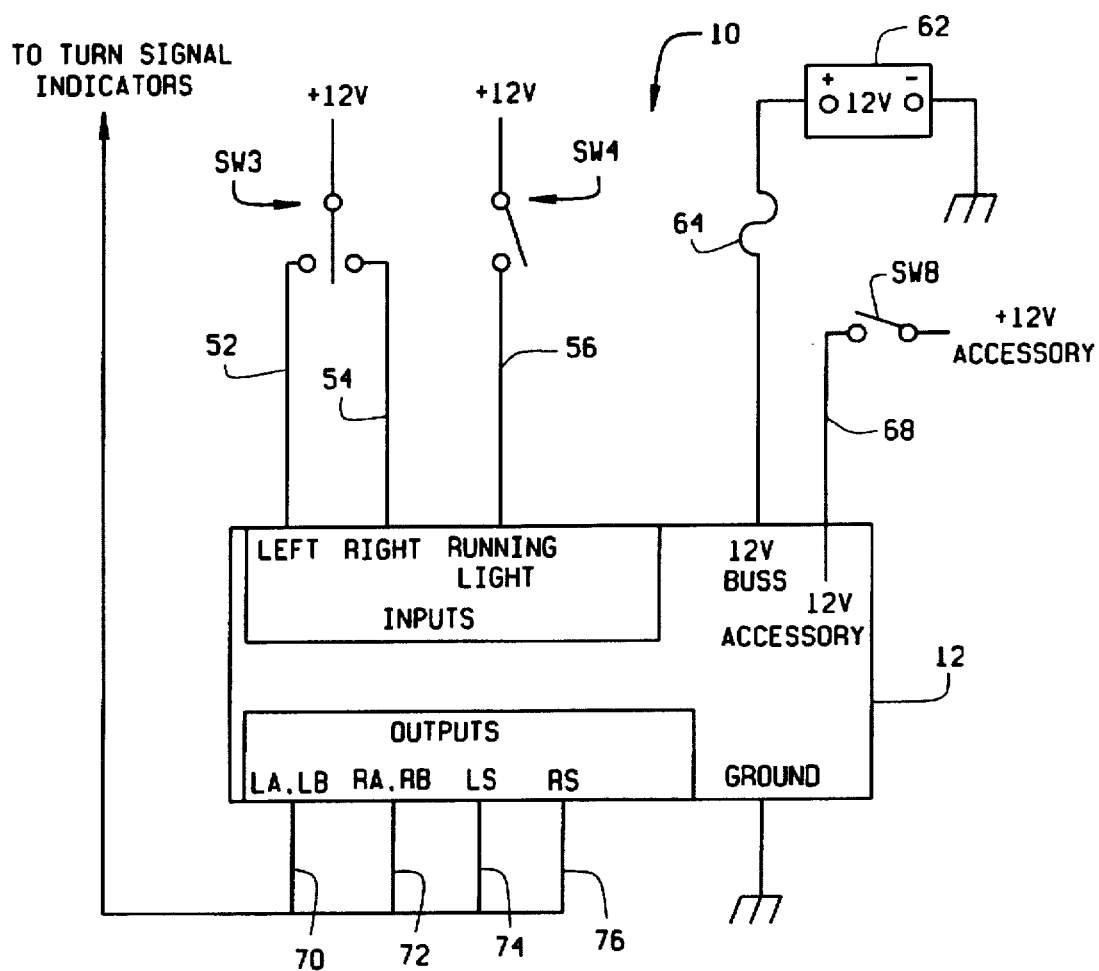
FIG. 1 is a block diagram showing the wiring configuration for a vehicle having a first embodiment of the turn signal control system of the present invention installed therein.
Figure 2:
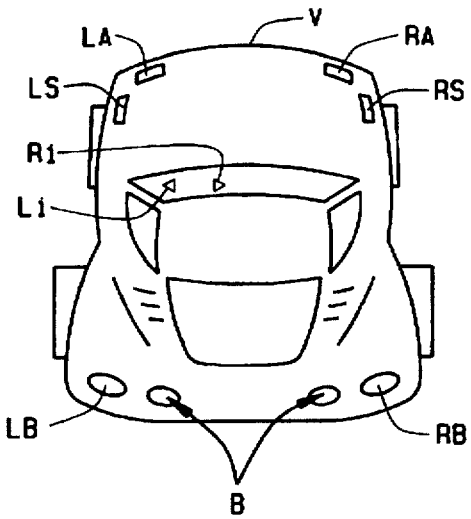
FIG. 2 is a top plan view of a vehicle having the circuitry of FIG. 1 installed therein, illustrating the location of the turn signal indicators.
Figure 3:
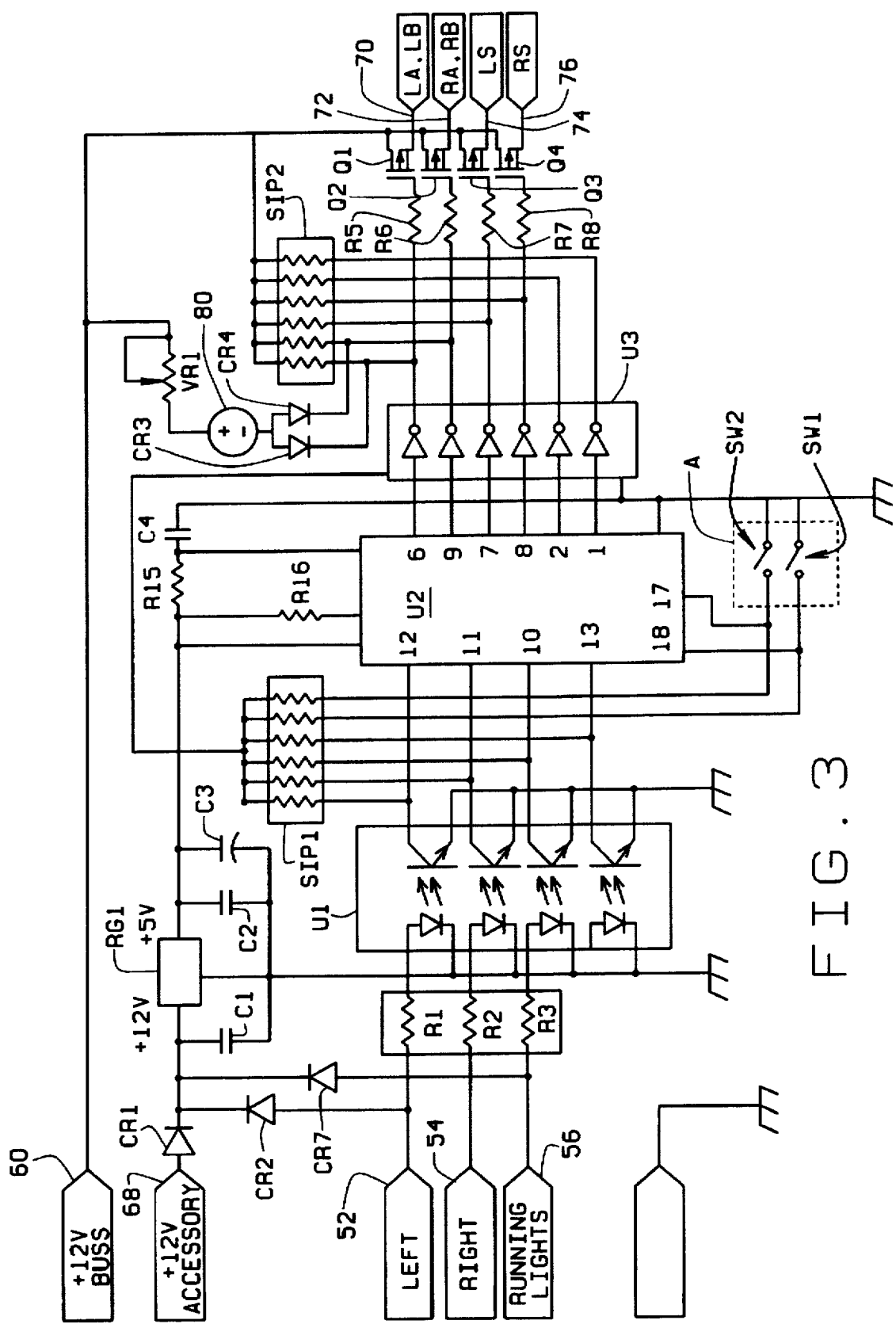
FIG. 3 is a schematic diagram illustrating the circuitry associated with the first embodiment of the present invention.

Referring now to FIGS. 1-3, there is shown a first embodiment of a control system, indicated generally as Auto Flasher System 10, for providing operational control of visual indicators or light bulbs (LA, RA, LB, RB, LS, RS) associated with a turn signal system of a vehicle V. As discussed below in greater detail, the control system 10 includes solid state control circuitry 12 that automatically flashes the visual indicators (LA, RA, LB, RB, LS, RS) a predetermined number of times upon manual actuation of the system 10. The system 10 is manually actuated by momentarily pressing a conventional turn signal lever (not shown) associated with the vehicle V into an intermediate position for a brief time interval (e.g., no longer than one flash).

As discussed in the BACKGROUND OF THE INVENTION section, the turn signal lever generally has a latched position, and an intermediate position for the turn signal indicators associated with the left-hand side (LA, LB, LS) and right-hand side (RA, RB, RS) of the vehicle. The lever also has a deactivated or disengaged position that does not trigger energization of the turn signals. The operator can press the lever into the latched position when it is desired to have the turn signals LA, LB, LS or RA, RB, RS flash repeatedly until the vehicle V is steered in the direction indicated by the turn signal. As is known in the art, two inside indicators (Li, Ri) are disposed on or near a vehicle dashboard such that one inside indicator Li flashes when the left turn signal indicators LA, LB, LS are energized, and the other inside indicator Ri flashes when the right turn signal indicators RA, RB RS are energized. After completing the turn, the lever may return from the latched position to the deactivated position such that the selected turn signal indicators and the flashing inside indicator is deenergized.

The present invention allows for improved control of vehicle turn signal operation by allowing the user to selectively trigger the turn signal indicators LA, LB, LS or RA, RB, RS to flash a predetermined number of times based upon how long the turn signal lever is held in the intermediate position. When the operator releases the lever from the intermediate position, the lever returns to the deactivated position automatically. However, depending on the configuration of the system 10 and the time interval that the operator held the lever in the intermediate position, the system 10 can cause the turn signal indicators to continue flashing a set number of times after the lever returns to the deactivated position.

Figure 4:
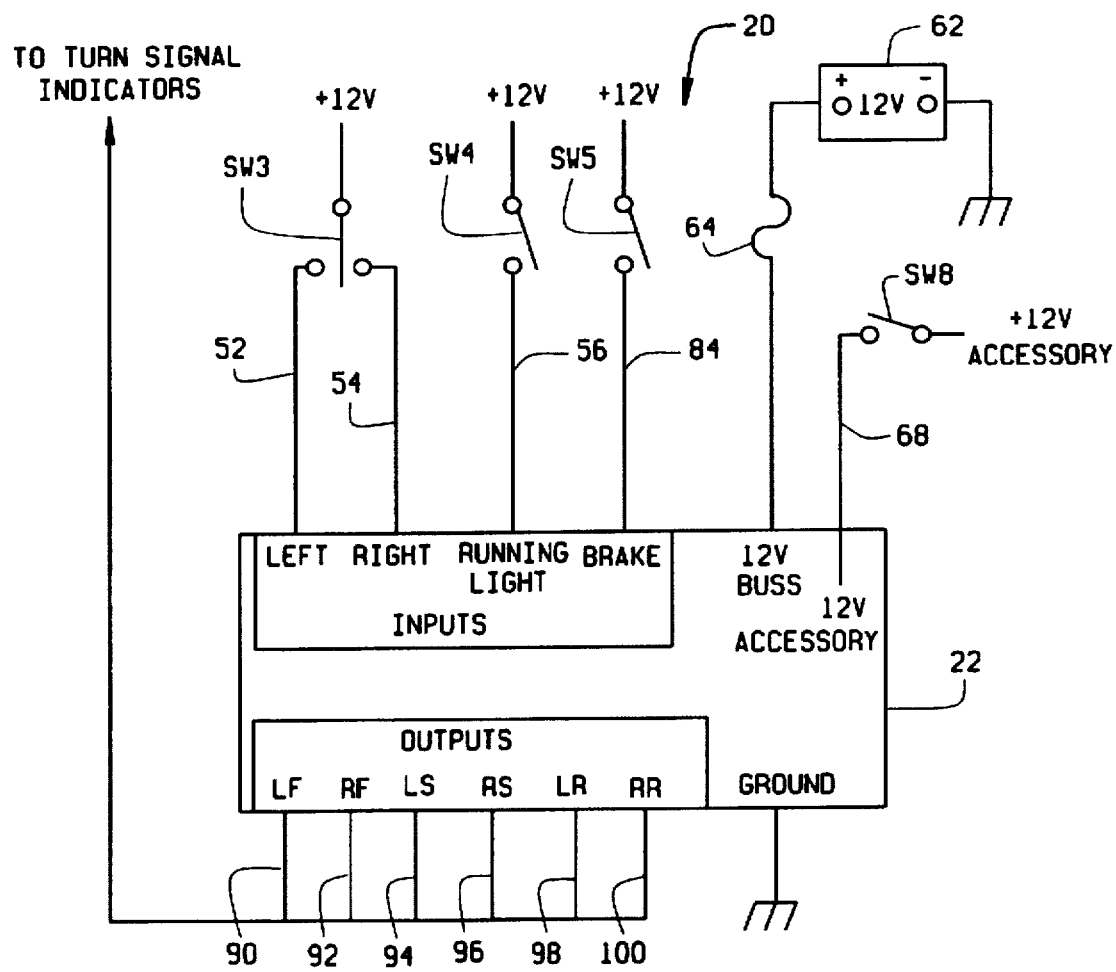
FIG. 4 is a block diagram showing the wiring configuration for a vehicle having a second embodiment of the turn signal control system installed therein.
Figure 5:
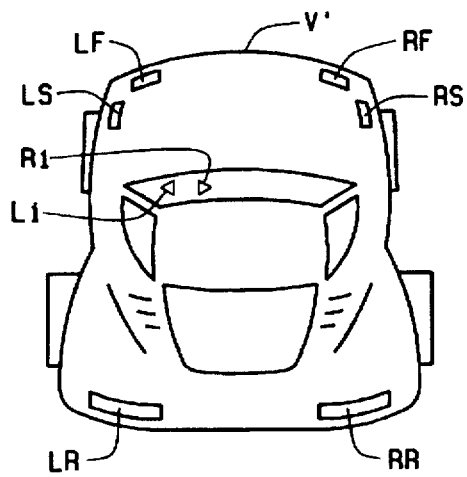
FIG. 5 is a top plan view of the vehicle having the circuitry of the second embodiment installed therein, illustrating the location of the turn signal indicators.
Figure 6:
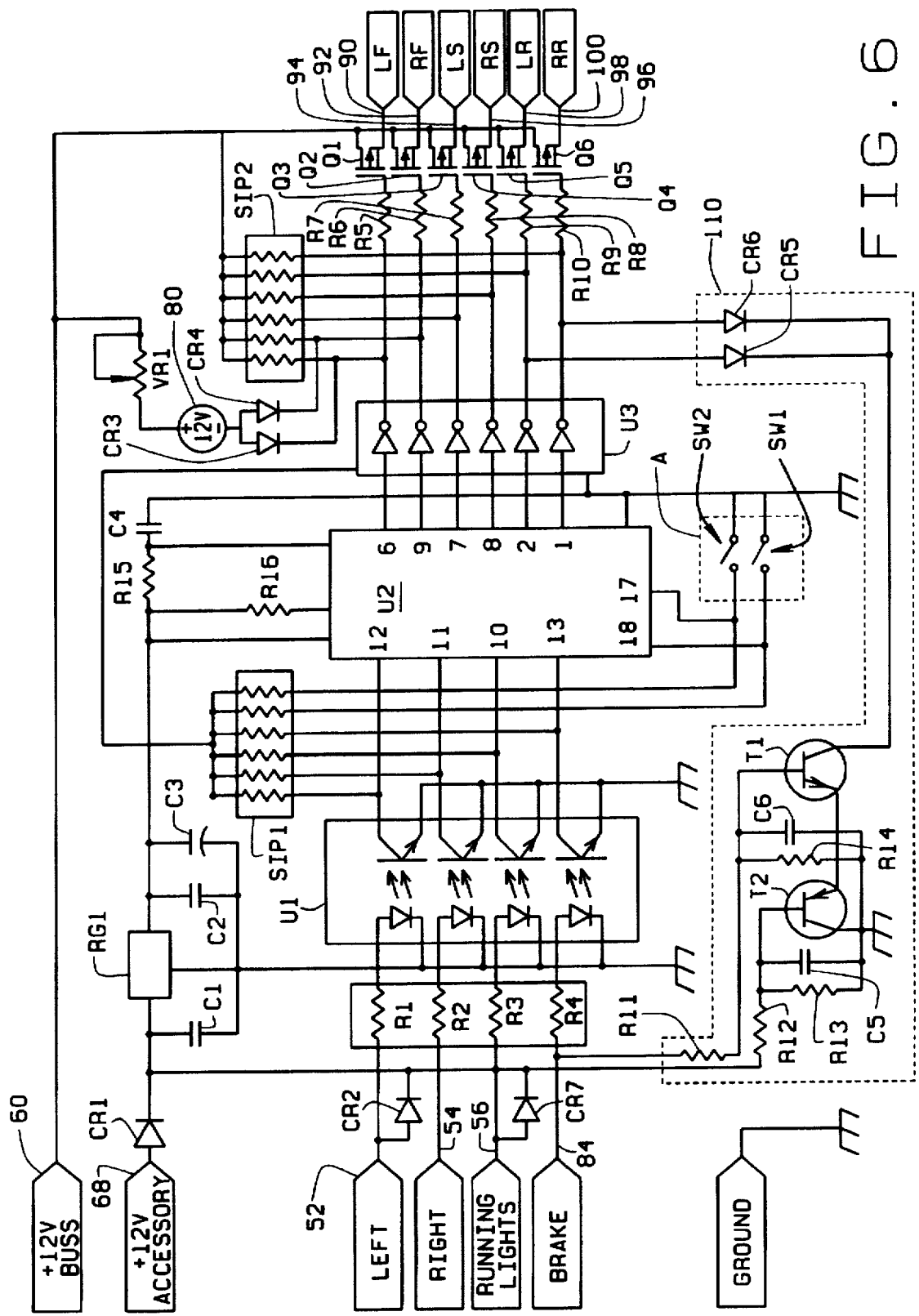
FIG. 6 is a schematic diagram illustrating the circuitry associated with the second embodiment of the present invention.
Figure 7:
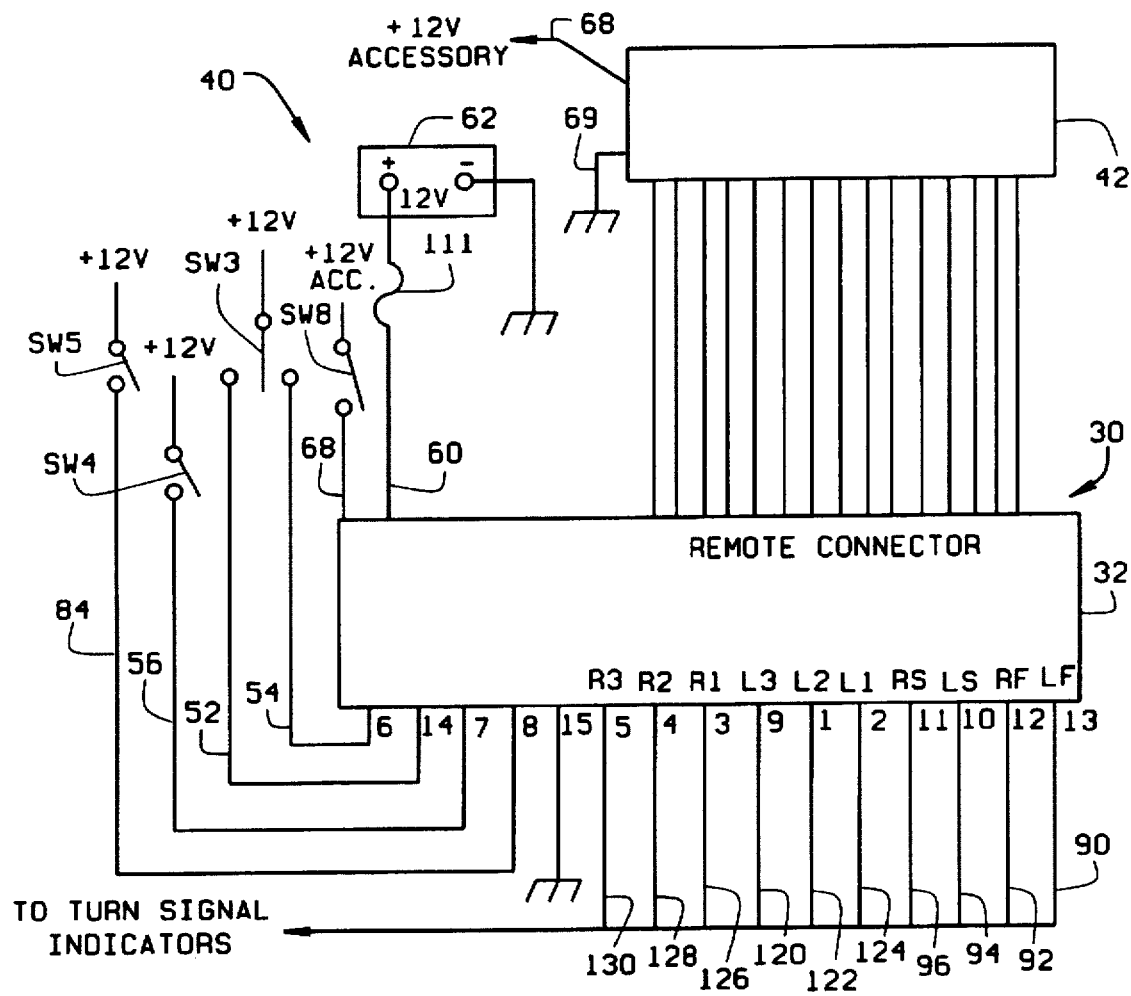
FIG. 7 is a block diagram showing the wiring configuration for a vehicle having a third embodiment of the turn signal control system installed therein, and further illustrating the connection of a remote control unit to the control system.
Figure 8:
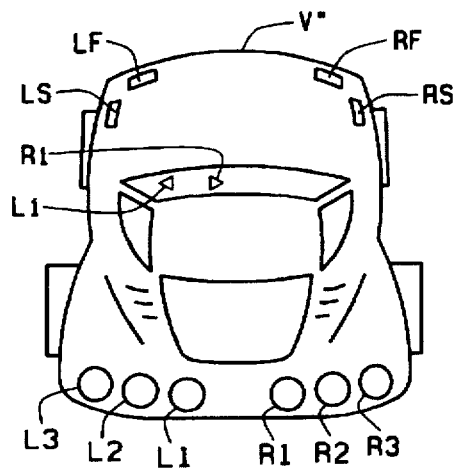
FIG. 8 is a top plan view of a vehicle having the circuitry of the third embodiment installed therein, illustrating the location of the turn signal indicators.
Figure 9:
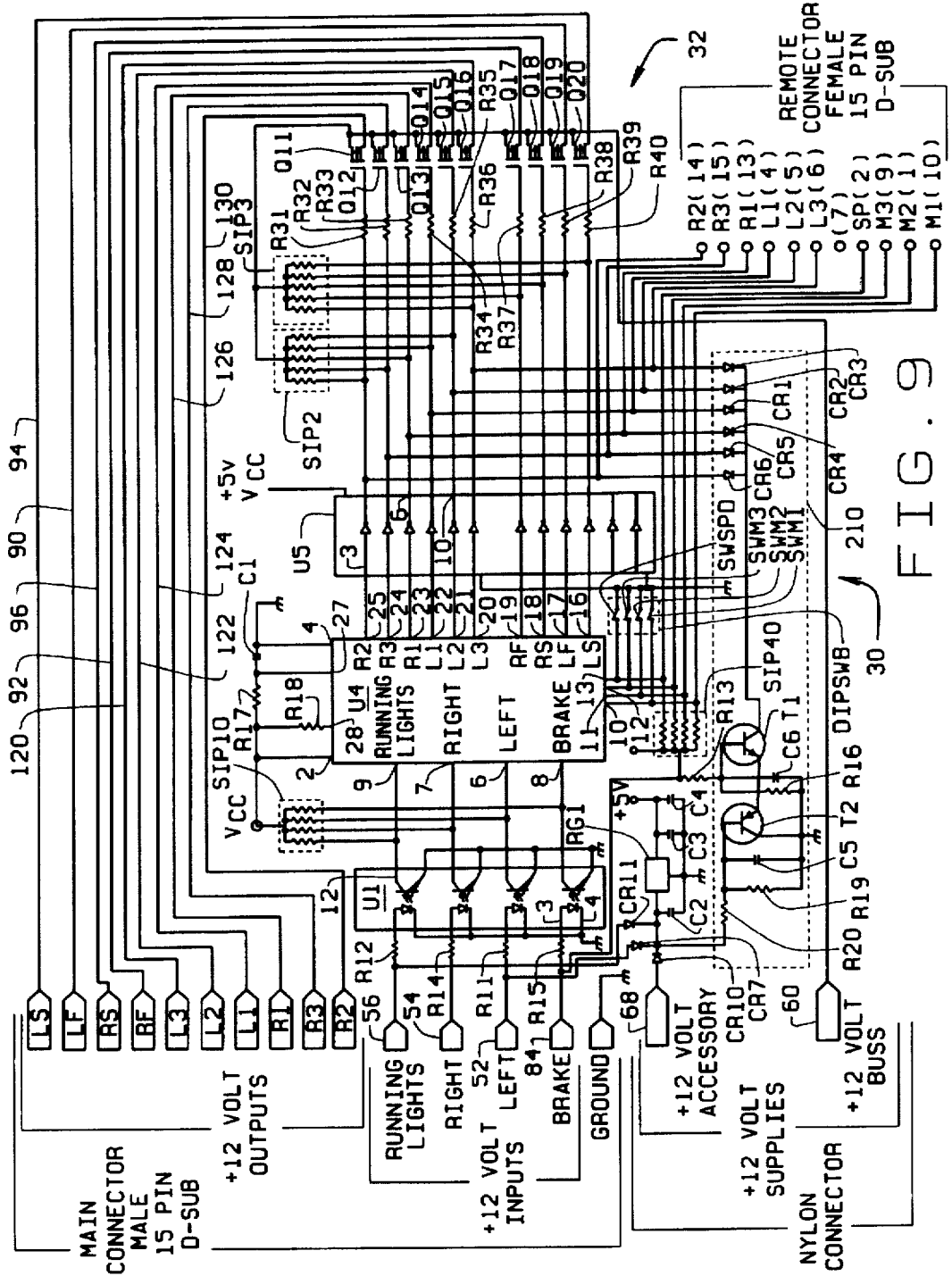
FIG. 9 is a schematic diagram of circuitry associated with the third embodiment of the present invention.

FIGS. 1-3, 4-6, and 7-9 illustrate three alternative embodiments of control circuitry 12, 22, 32 associated with turn signal control systems 10, 20, 30, respectively, of the present invention. In these figures, the control circuitry 12 for the first embodiment is shown in FIGS. 1-3, and referred to as System 10, as indicated above. The control circuitry 22 for the second embodiment is shown in FIGS. 4-6, and referred to as Auto Flasher System 20. The control circuitry 32 for the third embodiment is shown in FIGS. 7 and 9, and referred to as Tail Light Sequential Flasher System 30. FIGS. 7 and 10 also illustrate circuitry 42 associated with a remote control unit 40 which can be incorporated into the circuitry 32 of System 30, if desired. In general, the control circuitry 12, 22, 32 associated with each embodiment is a small computer controlled solid state device that controls a plurality of vehicle turn signal bulbs in a semi-automatic fashion. The vehicle bulbs are disposed in any conventional fashion known in the art. As shown in FIG. 2, the bulbs are preferably disposed such that two tail light bulbs LB and RB are located on either side of the rear of the vehicle V, two front light bulbs LA and RA are positioned on either side of the front of the vehicle V, and two side marker or running light bulbs LS and RS are positioned near the front of the vehicle on the left and right hand sides. When the operator wishes to move the vehicle V in a rightward direction, the lever is moved into the latched or intermediate position to cause the front, rear and side marker bulbs (RA, RB, RS) positioned on the right hand side of the car to flash repeatedly as well as the corresponding inside indicator Ri. Similarly, when the operator wishes to move the vehicle in a leftward direction, the lever manually actuated into the latched or intermediate position, thereby causing the front, rear and side bulbs (LA, LB LS) positioned on the left hand side of the car and the corresponding inside indicator Li to flash repeatedly.

If the turn signal switch lever is momentarily actuated without latching (i.e., moved into the intermediate position), the control circuitry 12, 22 or 32 triggers the selected bulbs to flash for a predetermined number of light pulses. The number of light pulses emitted by the selected bulbs can vary based upon the positioning of two switches SW1 and SW2 associated with a dip switch A used in control circuits 12 and 22 (discussed below). In the configuration shown in FIG. 3, each switch SW1, SW2 of dip switch A has two positions, allowing for a total of four combinations of switch positions. Each combination triggers the bulbs to flash a different number of times when the system is activated. For example, the control circuitry 12 can be configured such that the select bulbs flash three times when the switches SW1, SW2 are arranged in a first combination (Reference State 1), four times when switches SW1, SW2 are arranged in a second combination (Reference State 2), five times when the switches SW1, SW2 are arranged in a third combination (Reference State 3), and six times when the switches SW1, SW2 are arranged in a fourth combination (Reference State 4). The following table illustrates the four preset flash count selections set forth in the above example:

TABLE A

| FLASH COUNT SELECT Dip Switch A Positions (0 = closed, low; 1 = open, high) | | | FLASH COUNT Number of Flashes |
|---|---|---|---|
| SW1 | SW2 | Reference State | per Input Pulse |
| 0 | 0 | 1 | 3 |
| 0 | 1 | 2 | 4 |
| 1 | 0 | 3 | 5 |
| 1 | 1 | 4 | 6 |

In general, a flash count is activated when the turn signal lever is briefly tapped into the intermediate position. As discussed below, the turn signal lever is operably connected to a turn signal switch SW3, which, in turn controls the energization of the left turn signal indicators LA, LB, LS or the right turn signal indicators RA, RB, RS. Running light switch SW4 inverts the state of outputs 74 and 76. As set forth in Table A, if the FLASH COUNT SELECT is configured in Reference State 1 (SW1=0; SW2=0), and the turn signal lever is tapped once downwardly, all left turn signal bulbs LA, LB, LS and inside indicator Li flash three times. If the FLASH COUNT SELECT is arranged in Reference State 2, and the turn signal lever is tapped once downwardly, all left turn signal bulbs LA, LB, LS and inside indicator Li flash four times. If the FLASH COUNT SELECT is arranged in Reference State 2, and the turn signal lever is tapped twice downwardly, all left turn signal bulbs LA, LB, LS and inside indicator Li flash eight times. In this situation, the FLASH COUNT is multiplied by the number of times the lever is tapped in the intermediate position in one direction.

The number of times the lever is pressed into the intermediate position is referred to as the FLASH COUNT MULTIPLIER. In the preferred embodiment, the FLASH COUNT can be multiplied up to ten times by pressing the turn signal lever into the intermediate position ten consecutive times. In other words, the FLASH COUNT MULTIPLIER in the preferred embodiment has a maximum value of ten. As set forth below, the FLASH COUNT MULTIPLIER can be divided between the left and right sides.

In the system shown in FIGS. 1 and 3, if the turn signal switch lever is briefly tapped two consecutive times into the intermediate position, the circuitry 12 of System 10 causes the bulbs to flash twice as many times as compared to when the lever is tapped once. In the example set forth above, if the switches SW1, SW2 are in Reference State 2 and the lever is tapped twice in the intermediate position, the selected bulbs flash a total of eight times. Likewise, if the switches SW1, SW2 are in Reference State 4 and the lever is briefly tapped twice into the intermediate position, the selected bulbs flash twelve times.

The circuitry 12 shown in FIGS. 1 and 3 also provides for easy lane change signaling by allowing the operator, while the bulbs on one side of the car (e.g., the right side) are flashing, to trigger the system to flash the bulbs on the other side of the car (e.g., the left side) after the first side indicators stop flashing. For example, if the dip switches SW1, SW2 are positioned in Reference State 4 as set forth above, and the turn signal lever is briefly tapped once in the intermediate position to indicate a lane change to the left, the left turn signal bulbs LA, LB, LS flash six times. At any time during these six flashes the turn signal lever can be briefly tapped in the other intermediate position to indicate a right lane change. Even though the bulbs are still flashing on the left hand side of the vehicle, a microprocessor U2 associated with the control circuitry 12 processes this command, and stores data in an associated memory storage device also associated with the control circuitry 12 representative of the number of flashes to be emitted by the turn signal indicators RA, RB, RS on the right-hand side of the vehicle V such that the control circuitry 12 triggers the right indicators RA, RB, RS to flash after the left indicators L1, L2, LS expire for a predetermined delay period (e.g., after the left indicators stop flashing for five seconds). In the above example, when the turn signal lever is briefly tapped left and the right in the intermediate positions, six flashes are emitted by the left bulbs LA, LB, LS, a five second delay occurs, and then six flashes are emitted by the right bulbs RA, RB, RS. Similarly, the control circuitry 12 allows the operator to trigger the right bulbs to flash, and then the left bulbs to flash after a delay period. As discussed above, the FLASH COUNT MULTIPLIER allows for the turn signal lever to be pressed upwardly or downwardly up to 10 times.

The first embodiment of the circuitry 12 also allows the user to control the number of flashes by holding the turn signal lever in the intermediate position for a brief period of time such as for two or more flashes. The lights will stop flashing as soon as the turn signal lever is released to the deactivated position. Thus, the semiautomatic turn signal features set forth above can be canceled prematurely by holding the turn signal lever in the intermediate position (upwardly or downwardly) for two or more flashes. For example, if the FLASH COUNT SELECT is in Reference State 4 and the turn signal lever is pressed in the intermediate position four times upwardly, all right turn signal bulbs RA, RB, RS and inside indicator Ri flash twenty-four (24) times. If the operator wishes to stop the flash cycles of the bulbs after only five flashes, the operator simply holds the turn signal lever upwardly in the intermediate position for two or more flashes. The bulbs stop flashing as soon as the turn signal lever is released. In control systems 20 and 30 (discussed below), the semiautomatic functions can be prematurely terminated by tapping the brake pedal once during any flash cycle sequence.

As shown in FIG. 1, the control circuitry 12 is easily incorporated into any conventional vehicle turn signal system by slightly modifying existing wiring configurations in the manner set forth herein. The control circuitry 12 is operably connected to an existing turn signal switch SW3. The turn signal switch SW3 is operably connected to the turn signal lever such that movement of the lever by the operator controls the position of the turn signal switch SW3. The position of the turn signal switch SW3 controls the energization of the left turn signal indicators LA, LB, LS and the right turn signal indicators RA, RB, RS. The position of the turn signal switch SW3 also controls energization of the inside indicators Li, Ri. The control circuitry 12 also is operably connected to a conventional running light switch SW4 that controls illumination of bulbs LS (Left Side) and RS (Right Side) only. Running light switch SW4 energizes the side lights LS and RS for steady, continuous illumination. These lights LS and RS are marker (running) lights, and also flash when left or right turn signal switch SW3 is pressed. As discussed above, switch SW3 inverts the state of outputs 74 and 76.

As shown in FIG. 3, the control circuitry 12 includes a microprocessor U2 that receives input signals from the turn signal switch SW3 via inputs 52 and 54 indicating whether energization of the left turn signal bulbs LA, LB, LS, Li or right turn signal bulbs RA, RB, RS, Ri is requested. Input signals are also supplied to the microprocessor U2 by the running light switch SW4 via input 56 indicating whether energization of the side marker bulb LS or RS is required. More specifically, each of the left turn input signal, right turn input signal and marker input signal passes through a resistor R1, R2, R3, respectively, preferably having a resistance value of 1,000 ohms and a plurality of opto-couplers U1 before being supplied to the microprocessor U2 (see FIG. 1). In the preferred embodiment, the opto couplers U1 have the model number PS-2501-4 NEC, and the microprocessor U2 has a model number of 16C54-RC/P. Resistors SIP1 (10K ohm) are connected in series between a power source of +5 volts and each opto coupler (phototransistor-collector pin) U1.

Operation of hazard lights also is controlled by the control circuitry 12 such that the flash sequence of the hazard lights is the same as that of the turn signals. When a hazard light switch (not shown) is manually actuated, left and right inputs 52 and 54, respectively, are energized simultaneously. When both inputs 52, 54 are energized, all turn signal indicators RA, RB, RS, LA, LB, and LS flash simultaneously at the same interval count.

The dip switches SW1, SW2 are operably connected to the microprocessor U2 as shown in FIG. 3. As discussed above, the dip switch A settings can be adjusted in one of four possible combinations to control the number of times the selected bulbs flash upon activation of the microprocessor U2 when the turn signal lever is held in the intermediate position by the operator.

The microprocessor U2 includes six output terminals (pins 1, 2, 6, 7, 8, 9), each electrically connected to an input terminal (pins 1, 3, 5, 9, 11, 13) of a NOT gate or inverter U3. The microprocessor U2 generates four different output signals, with one output signal controlling the operation of each of the following indicators: left turn signals (front and rear) LA, LB; right turn signals (front and rear) RA, RB; left side marker LS, and right side marker RS. In the preferred embodiment, the NOT gates U3 have a model number of 7406. As shown in FIG. 3, each output signal of each NOT gate controls the operation of a power HEXFET Q1, Q2, Q3, Q4 (preferably model number IRF9530), which in turn controls energization of the left turn signal bulbs LA, LB, the right turn signal bulbs RA, RB, the left and right side marker bulbs LS, RS and the left and right inside indicators Li and Ri.

The components of circuitry 12 shown in FIGS. 1 and 3 operate in the following manner (reference numbers and characters discussed in the following description correspond to components shown in FIGS. 1–3):

+12 VOLT SUPPLIES 60, 68

A +12 volt BUSS 60 is fused to a positive terminal of a battery 62 with a 20 amp fast blow fuse 64 as shown in FIG. 1a. The 12 volt supply for BUSS 60 remains constant at all times, supplying a +12 volt potential to HEXFETs Q1, Q2, Q3, Q4, a parallel combination of pull up resistors SIP2 (preferably 10k Ω each ), and variable resistor VR1 (preferably 20k Ω). Wire for 12 volt BUSS 60 preferably is 12 gauge.

A +12 volt ACCESSORY power source 68 supplies 12 volts to a 5 volt regulator RG1 (model No. 78057) through diodes CR1, CR2, and CR7. Switch SW8 shown in FIG. 1 is a conventional accessory switch that is actuated by an operator turning a key in the vehicle's ignition starter. The output of the 5 volt regulated supply RG1 is filtered with two capacitors C1 and C2 (0.1 µF, 50 V), and one electrolytic capacitor C3 (220 µF, 35 V). The 5 volt filtered signal then is supplied to the following specified components for logic control functions: a parallel combination of resistors SIP1 (preferably 10k Ω each), microprocessor U2 (pin 14), inverter U3 (pin 14), a resistor R16 (preferably 10k Ω) and a R/C network including resistor R15 (10 k Ω) and capacitor C4 (33 pf, ceramic disk). Resistor R15 and capacitor C4 provide the operating frequency for microprocessor U2. The operating speed (frequency) for the microprocessor U2 can be adjusted by varying the value of resistor R15.

If the 12 volt ACCESSORY Supply 68 is off, logic controls do not function. If left and right inputs 52, 54 are energized simultaneously to activate the hazard lights, the left input circuit (define) also supplies power for logic controls so hazard lights operate properly.

The blocking diode CR1 (model No. 1N4001) is provided to prevent a positive potential from feeding back through the 12 volt ACCESSORY circuit when the left input 52 supplied to the circuitry 12. The second blocking diode CR2 (model No. 1N4001) is provided to prevent a positive potential from feeding back through the 12 volt left input circuit (define) when the 12 volt ACCESSORY Supply 68 is applied to the circuitry 12. The third blocking diode CR7 prevents a positive potential from feeding back through the 12 volt running lights input 56 when the 12 volt ACCESSORY supply 68 is applied to the circuitry 12.

+12 VOLT INPUTS 52, 54, 56

As shown in FIG. 3, resistors R1, R2 and R3 are dropping resistors for the input light emitting diodes (LEDs) Associated with opto-coupler U1. When any input LED illuminates in opto-coupler U1, the illuminated LED forward biases a corresponding photo transistor, allowing a negative signal to be applied through the emitter terminal of the transistor to the collector terminal, and to a corresponding input pin 10, 11 or 12 on microprocessor U2. Pull-up resistors SIP 1 supply a positive (high) logic level to the input pins (10, 11, 12, 17, 18) on microprocessor U2. High logic levels are only present on microprocessor U2 input pins when there are no negative (low) signals supplied by opto-coupler U1 and switches SW1 and SW2 associated with dip switch A are in the open position (logic 1, high). When the system 10 is in operation and a negative signal is supplied from the opto-coupler U1 to any input pin (10, 11, 12, or 13) on microprocessor U2, the circuitry 12 commences a sequence of logic functions corresponding to input commands as described herein. As discussed above with reference to Table A, the two toggle switches SW1, SW2 of dip switch A have two positions each, allowing for the following four combinations: combination 1=SW1 and SW2 closed (Reference State 1), combination 2=SW1 closed and SW2 open (Reference State 2), combination 3=SW1 open and SW2 closed (Reference State 3), combination 4=SW1 and SW2 open (reference State 4).

+12 VOLT OUTPUTS 70, 72, 74, 76

Logic level outputs associated with pins 1, 2, 6, 7, 8, 9 of microprocessor U2 are maintained at a low logic level (logic 0) when there are no output functions associated with the System 10. When input commands are supplied to microprocessor U2, corresponding output command functions are generated by the microprocessor U2 such that any of the logic level outputs (pins 1, 2, 6, 7, 8, 9) of the microprocessor U2 are maintained at a high logic level (logic 1) when the indicator bulb that is electrically coupled thereto is to be energized by the System 10. Each high logic level signal is supplied to an associated inverter driver U3 so that the output of that inverter is a low logic level. As shown in FIG. 3, any low level output signal generated by the inverters U3 is supplied to its corresponding HEXFET Q1, Q2, Q3 or Q4, thereby activating the HEXFET to supply +12 volts to its corresponding light bulb via outputs 70, 72, 74 or 76. When no inverters U3 generate output signals having low logic levels, pull-up resistors SIP2 maintain the outputs of the inverters U3 at +12 volts. Each of outputs 70 and 72 preferably is connected to no more than two bulbs. In the preferred embodiment, output 70 is connected to two bulbs, LA and LB, and output 72 is connected to two bulbs, RA and RB. Bulbs LA, LB, RA and RB are style No. 1157 or equivalent. Outputs 70, 72 draw approximately no more than 6 amps each, with 2 bulbs connected to each output. Output 74 and 76 are connected to low intensity marker lights LS and RS, respectively. These two outputs 74, 76 preferably have either one or two bulbs per output.

In System 10, the illumination of brake lights B, shown in FIG. 2, is controlled in a conventional manner by manual operation of a brake pedal, which, in turn, selectively closes a brake pedal switch (not shown).

+12 VOLT BEEPER 80

A pair of diodes CR3 and CR4 are connected to the output driver stage, pins 2 and 8 of inverter U3. Diodes CR3 and CR4 are blocking diodes that prevent control signals from interfering with one another while supplying a negative voltage signal to a 12 volt beeper 80. Variable resistor VR1 provides adjustable voltage drop for beeper volume adjustment. The beeper 80 is an optional feature in the System 10.

The circuitry 12 shown in FIG. 1–3 differs from the circuitry 22 shown in FIGS. 4–6 in that circuitry 22 of System 20 also provides for control of brake light bulbs LR (left rear) and RR (right rear) which are also used for the rear turn signal indicators on a vehicle V' (see FIG. 5). If the vehicle V' has a tail light setup with rear turn signals and brake lights in the same circuit, the control circuitry 22 of FIGS. 4–6 are used to control operation of the brake light and rear turn signal bulbs RR and LR, in addition to front turn signal bulbs LF (left front) and RF (right front), side marker bulbs LS and LR, and inside indicators Li and Ri. This circuitry 22 is substantially similar to that shown in FIG. 3 (circuitry 12), except that the microprocessor U2 receives an additional input signal 84 from a brake switch SW5 when a brake pedal or similar device that is operably connected to the brake switch SW5 is pressed by the operator to decelerate the vehicle V' (see FIGS. 4 and 6). Furthermore, the microprocessor U2 utilizes six output terminals (pins 1, 2, 6, 7, 8, 9), with one output signal being generated by the microprocessor U2 at each output terminal to control the operation of each of the following indicators: left front turn signal LF; right front turn signal RF; left side marker LS; right side marker RS; left rear turn signal LR; and right rear turn signal RR. As further shown in FIG. 6, two additional NOT gates U3, two additional HEXFETs Q5 and Q6 and other circuitry resistor components R9, R10 are also included in the circuitry 22 to process the output signals generated at output terminal pins 2 and 1 of the microprocessor U2.

The circuitry components 32 shown in FIGS. 4 and 6 operate in the following manner (reference numbers and characters discussed in the following description correspond to components shown in FIGS. 4–6):

+12 VOLT SUPPLIES 60, 68

As shown in FIGS. 1 and 3 for circuitry 12, circuitry 22 also includes a +12 volt BUSS 60 that is fused at the positive terminal of a battery 62 with 25 amp fast blow fuse 64 as shown in FIGS. 4 and 6. The 12 volt supply for BUSS 60 remains constant at all times, supplying a +12 volt potential to HEXFETs Q1, Q2, Q3, Q4, Q5 and Q6, pull-up resistors SIP 2 and variable resistor VR1. Wire for 12 volt BUSS 60 preferably is 10 gauge.

As in circuitry 12, circuitry 22 also includes a +12 volt ACCESSORY power source 68 that supplies 12 volts to a 5 volt regulator RG1 through diodes CR1, CR2 and CR7. The output of the 5 volt regulated supply RG1 is filtered with two capacitors C1 and C2 (0.1 μF, 50 v) and one electrolytic capacitor C3 (220 μF, 35 v). The 5 volt filtered signal then is supplied to the following specified components for logic control functions: a parallel combination of resistors SIP 1, microprocessor U2 (pin 14), inverter U3 (pin 14), resistor R16 and a R/C network including resistor R15 and capacitor C4. Resistor R15 and capacitor C4 provide the operating frequency for microprocessor U2. The operating speed (frequency) of the microprocessor U2 can be adjusted by varying the value of resistor R15.

If the 12 volt ACCESSORY supply 68 is off, logic controls do not function. If left and right inputs 52, 54 are energized simultaneously to activate the hazard lights, the left input circuit also supplies power for logic controls so hazard lights operate properly.

As discussed above, the blocking diode CR1 is provided to prevent a positive potential from feeding back through the 12 volt ACCESSORY circuit when the left input 52 is supplied to the circuitry 22. The second blocking diode CR2 is provided to prevent a positive potential from feeding back through the 12 volt left input circuit (define) when the 12 volt ACCESSORY 68 supply is applied to the circuitry 22. The third blocking diode CR7 prevents a positive potential from feeding back through the 12 volt running lights input 56 when the 12 volt ACCESSORY supply 68 is applied to the circuitry 22.

+12 VOLT INPUTS 52, 54, 56, 84

As shown in FIG. 6, resistors R1, R2, R3 and R4 (preferably 1k Ω each) are dropping resistors for input light emitting diodes (LEDs) associated with opto-couplers U1. When any input LED illuminates in opto-coupler U1, the illuminated LED forward biases a corresponding photo transistor, allowing a negative signal to be applied through the emitter to the collector, and to a corresponding input pin 10, 11, 12 or 13 on microprocessor U2. Pull-up resistors SIP1 supply a positive (high) logic level to all input pins (10, 11, 12, 13, 17, 18) on microprocessor U2. High logic levels are only present on microprocessor U2 input pins when there are no negative (low) signals supplied by opto-coupler U1 and switches SW1 and SW2 associated with dip switch A are in the open position (logic 1, high). When the system 20 is in operation and a negative signal is supplied from the opto coupler U1 to any input pin (10, 11, 12 or 13) on microprocessor U2, the circuitry 22 commences a sequence of logic functions corresponding to input commands as described on herein. As discussed above for circuitry 12, the two toggle switches SW1 and SW2 of dip switch A have two positions each, allowing for the following combinations: 1=SW1 and SW2 closed (Reference State 1), combination 2=SW1 closed and SW2 open (Reference State 2), combination 3 =SW1 open and SW2 closed (Reference State 3), combination 4=SW1 and SW2 open (Reference State 4).

+12 VOLT OUTPUTS 90, 92, 94, 96, 98, 100

Logic level outputs associated with pins 1, 2, 6, 7, 8, 9 of microprocessor U2 are maintained at a low logic level (logic level 0) when there are no output functions associated with the System 20. When input commands are supplied to the microprocessor U2, corresponding output command functions are generated by the microprocessor U2 such that any of the logic outputs (pins 1, 2, 6, 7, 8, 9) of the microprocessor U2 are maintained at a high logic level (logic 1) when the corresponding indicator bulb is to be energized by the System 20. Each high logic level signal then is supplied to an associated inverter U3 so that the output of that inverter U3 is at a low logic level. As shown in FIG. 6, any low level output signal generated by the inverters U3 is supplied to a corresponding HEXFET Q1, Q2, Q3, Q4, Q5 or Q6, thereby triggering the HEXFET to supply +12 volts to a corresponding bulb electrically connected thereto via output 90, 92, 94, 96, 98 or 100. When no inverters U3 generate output signals having low logic levels, pull-up resistors SIP2 maintain the output of the inverters U3 at +12 volts. Outputs 90 and 92 (left front and right front) are preferably connected to only one bulb each (bulbs LF and RF, respectively). Outputs 98 and 100 (left rear and right rear) are preferably each connected to one or two bulbs each (bulbs LR and RR, respectively). Bulbs LF, RF, LR and RR are 1157 style, or equivalent. Outputs 90 and 92 preferably draw no more than 3 amps with one bulb connected to each output. Outputs 98 and 100 preferably draw no more than 6 amps with two bulbs connected to each output. Output 94 and 96 are connected to low intensity marker lights RS and LS, respectively. Outputs 94 and 96 can have either one or two bulbs per output.

+12 VOLT BEEPER 80

As discussed above for System 10, System 20 can include a 12 volt beeper 80, if desired. In this configuration, diodes CR3 and CR4 are connected to the output driver stage, pins 2 and 8 of inverter U3. Diodes CR3 and CR4 are blocking diodes, and they prevent control signals from interfering with one another while supplying a negative voltage signal to the beeper 80. Variable resistor VR1 provides adjustable voltage drop for beeper 80 volume adjustment.

BRAKE CONTROL SUB CIRCUIT 110

When ACCESSORY supply 68 is not applied to the circuitry 22, a transistor T2 conducts current from its collector terminal to its emitter terminal with the aid of two biasing resistors R12 and R13. Transistor T2 is a PNP transistor, preferably model No. 3906. Resistor R12 preferably is 1k Ω, and resistor R13 is preferably 10k Ω. In this situation, a brake signal input of a brake switch SW5 (FIG. 6) effectively energizes outputs 98, 100 without logic controls operating. When the brake signal input 84 is applied to the brake control sub-circuit 100, a transistor T1 conducts current from emitter to collector with the aid of biasing resistors R11 and R14. Preferably, transistor T2 is a PNP transistor (model 3906), resistor R11 is 1k Ω and resistor R14 is 10k Ω. The negative signal from transistor T1 forward biases diodes CR5 and CR6 to energize outputs 98 and 100.

If ACCESSORY power 68 is supplied to circuitry 22, transistor T2 is reverse biased, and transistor T2 no longer conducts current. Brake logic control associated with microprocessor U2 now functions and transistor T1 does not affect outputs 98 and 100. Diodes CR5 and CR6 are blocking diodes and prevent signals from interfering between outputs 98 and 100.

The control circuitry 32 of System 30 shown in FIGS. 7–9 differs from that shown in FIGS. 1–3 (System 10) in that the circuitry 32 of FIGS. 7 and 9 provides for sequential flashing of tail lights on the rear left side (L1, L2, L3) and on the rear right side (R1, R2, R3) of a vehicle V" (see FIG. 8). All tail lights are controlled by turn signal switch SW3 and brake switch SW5. The circuitry 32 in FIGS. 7 and 9 is a computerized turn signal control system that controls sequentially flashing turn signal lights such as, for example, turn signal indicators associated with early model Mercury Cougars, Shelby Mustang and Ford Thunderbirds. This circuitry 32 replaces existing turn signal and tail light control systems in vehicles having sequential tail light flashing. The control circuitry 32 of System 30 also can be installed in automobiles that never had such a sequential turn signal system. For example, the circuitry can be installed in Pontiac Firebirds, Trans Ams and Fieros, 1969 Chevrolet Camaros, early and late model Chevrolet Impalas, 1969 Dodge Chargers, Dodge Daytonas, early model Ford Mustangs, and other custom applications.

As discussed above, the control circuitry 32 also can include a remote control unit 40 having control circuitry 42 that can be linked or incorporated into the circuitry 32. The remote control unit 40 is not required for operation of main control circuitry 32. However, as discussed below, when the remote unit 40 is used, it greatly enhances the control and operation of the control circuitry 32.

More specifically, the control circuitry 32 shown in FIGS. 7 and 9 is a tail light sequential flasher system that features five flash modes in the preferred embodiment. The number of flash modes can be expanded to eight flash modes, as discussed below. The control circuitry 32 features two speed operation, namely, auto flash for easy lane change and auto flash cancel. If emergency flashers are used, the brake lights automatically override the flashers when applied.

The auto flash feature helps extend the life of the turn signal switch SW3 latch mechanism, and also helps prevent the turn signals from being left on while driving. This feature increases the ease of operation of the turn signal lever, and also may increase use of turn signals, helping to improve traffic safety conditions.

The operation of the control circuitry 32 in FIGS. 7 and 9 has many similarities to that shown in FIGS. 1 and 3 for circuitry 12 and in FIGS. 4 and 6 for circuitry 22. As shown in FIG. 9, each output signal of microprocessor U4 associated with the circuitry 32 is transmitted from the microprocessor U4 to one of a plurality of NOT gates U5, through one of resistors R31, R32, R33, R34, R35, R36, R37, R38, R39 or R40. The output of each NOT gate U5 is supplied to a corresponding power HEXFETs Q11, Q12, Q13, Q14, Q15, Q16, Q17, Q18, Q19 or Q20. High speed switching power HEXFETs Q11–Q20 are used to generate strong light pulse signals.

The control circuitry 32 and remote control unit 40 provide dependable, trouble free operation under normal automotive driving conditions.

The components of circuitry 32 shown in FIGS. 7 and 0 operate in the following manner (reference numbers and characters discussed below correspond to components shown in FIGS. 7–9):

+12 VOLT SUPPLIES 60, 68

The +12 volt BUSS 60 shown in FIGS. 7 and 9 is fused at a positive terminal of a battery 62 with a 25 amp fast blow fuse 111. The 12 volt supply for BUSS 60 remains constant at all times, supplying a +12 volt potential to HEXFETs Q11, Q12, Q13, Q14, Q15, Q16, Q17, Q18, Q19, and Q20, and pull-up resistors SIP20 and SIP30. Wire for the 12 volt BUSS 60 preferably is 10 gauge.

As discussed above for circuitry 12 and circuitry 22, circuitry 32 also includes a +12 volt ACCESSORY power source 68 that supplies 12 volts to a 5 volt regulator RG1 through diodes CR7, CR10, and CR11. The output from the 5 volt regulated supply RG1 is filtered by two capacitors C2 and C3 (0.1 μF, 50 v) and a electrolytic capacitor C4 (220 μF, 35 v). The 5 volt filtered signal then is supplied to the following specified components for logic control functions: a first parallel combination of resistors SIP 1, a second parallel combination of resistors SIP 4, inverter U2 (pin 14), inverter U3 (pin 14), microprocessor U4 (pin 2), resistor R18 and a R/C network including resistor R17 and capacitor C1. Resistor R17 and capacitor C1 provide the operating frequency for microprocessor U4. The operating speed (frequency) of the microprocessor U4 can be adjusted by varying the value of resistor R17.

If the 12 volt ACCESSORY supply 68 is off, logic controls do not function. If left and right inputs 52, 54 are energized simultaneously to activate the hazard lights, the left input circuit (define) also supplies power for logic controls so hazard lights operate properly.

The first blocking diode CR10 is provided to prevent a positive potential from feeding back through the 12 volt ACCESSORY circuit when the left input 52 is supplied to the circuitry 32. The second blocking diode CR7 is provided to prevent a positive potential from feeding back through the 12 volt left input circuit when the 12 volt ACCESSORY supply 68 is applied to the System 30. The third blocking diode CR11 prevents a positive potential from feeding back through the 12 volt running lights input 56 when the 12 volt ACCESSORY supply 68 is applied to the circuitry 32.

+12 VOLT INPUTS 52, 54, 56, 84

As shown in FIG. 7, resistors R11, R12, R14, R15, are dropping resistors for input LEDs associated with opto-couplers U1. When any input LED illuminates in opto-coupler U1, the illuminated LED forward biases a corresponding photo transistor, allowing a negative signal to be applied through the emitter to the collector and to a corresponding input pin 6, 7, 8 or 9 on microprocessor U4. Pull-up resistors SIP20 and SIP40 supply a positive (high) logic level to all input pins (6, 7, 8, 9, 10, 11, 12, 13) on microprocessor U4. High logic levels only are present on microprocessor U4 input pins when there are no negative (low) signals supplied by opto-coupler U1 and dip switch B has all selections in the open position. When the system 30 is in operation and a negative signal is supplied from the opto-coupler U1 to any input pin (6, 7, 8 or 9) on microprocessor U4, the circuitry 32 commences a sequence of logic functions corresponding to input commands as described herein. Dip switch B has four dual position, toggle switches M1, M2, M3 and SPD. Combinations for all flash modes are set forth below based upon the position of the toggle switches M1, M2, M3 and SPD.

+12 VOLT OUTPUTS 90, 92, 94, 96, 120, 122, 124, 126, 128, 130

Logic level outputs associated pins 16 through 25 of microprocessor U4 are maintained at a low logic level (logic 0) when there are no output functions associated with System 30. When input commands are supplied to microprocessor U4, corresponding output command functions are generated by the microprocessor U4 such that any of the logic outputs (pins 16–25) of the microprocessor U4 are maintained at a high logic level (logic 1) when the corresponding indicator bulb is to be energized by the System 30. Each high logic level signal then is supplied to an associated inverter U5 so that the output of that inverter U5 is at a low logic level. As shown in FIG. 9, any low level output signal generated by the inverters U5 is supplied to a corresponding HEXFET Q11, Q12, Q13, Q14, Q15, Q16, Q17, Q18, Q19, or Q20, thereby triggering the HEXFET to supply +12 volts to a corresponding bulb electrically connected thereto via output 90, 92, 94, 96, 120, 122, 124, 126, 128, or 130. When no inverters U5 generate output signals having low logic levels, pull-up resistors SIP20 maintain the outputs of the inverters U5 at +12 volts. Outputs 120, 122, 124 preferably are connected to one bulb only, and draw no more than 3 amps each. Outputs 126, 128, 130 preferably are connected to one bulb only, and draw no more than 3 amps each. Outputs 90 and 92 preferably are connected to one bulb only, and draw no more than 3 amps each. Bulbs LR, RF, L1, L2, L3, R1, R2 and R3 are preferably 1157 style or equivalent. Outputs 94, 96 are connected to low intensity marker lights LS and RS. Outputs 94, 96 preferably have either one or two bulbs per output.

+12 VOLT BEEPER SIGNAL 49

Diodes CR8 and CR9 are connected to the output driver stage, pins 6 and 10 of inverter U5. Diodes CR8 and CR9 are blocking diodes that prevent control signals from interfering with one another while supplying a negative signal to a 12 volt beeper 49 in the remote unit 40. A switch SW50 on remote control unit 40 selects beeper volume by either driving the beeper strait, or switching the signal through resistor R8, that preferably is a 10K OHM resistor in circuitry 42. The beeper 49 and associated circuitry are optional in this embodiment.

BRAKE CONTROL SUB CIRCUIT 210

As discussed above for circuitry 22, when ACCESSORY supply 68 is not applied to circuitry 32, a transistor T2 conducts from its collector to its emitter with the aid of two biasing resistors R19 and R20. In this situation, a brake signal input from brake switch SW5 energizes outputs 120, 122, 124, 126, 128 and 130 without logic controls operating. When the brake signal input 84 is applied, it causes transistor T1 to conduct from emitter to collector with the aid of biasing resistors R13 and R16. The negative signal from transistor T1 forward biases diodes CR1 through CR6 to energize outputs 120, 122, 124, 126, 128 and 130.

If ACCESSORY power 68 is supplied to circuit 32, it causes transistor T2 to be reverse biased. In this state, transistor T2 no longer conducts current. Brake logic control associated with microprocessor U4 now functions, and transistor T1 will not affect outputs 120, 122, 124, 126, 128 and 130. Diodes CR1 through CR6 are blocking diodes, and prevent signals from interfering between outputs 120, 122, 124, 126, 128 and 130.

Remote unit 40 shown in FIGS. 7 and 10 is capable of selecting flash modes, flash speed and beeper 49 volume. It also indicates flash sequences of sequential operation and beeper tone only when 12 volt ACCESSORY 68 is supplied to the circuitry 32. If remote unit 40 is used with the control circuitry 32, it is necessary to position all settings on dip switch B of the circuitry 32 in an open (UP) position for proper control using the remote unit 40. In circuitry 32, +12 volts is supplied from the ACCESSORY circuit 68 to the 5 volt regulator RG1. In circuitry 42, 5 volt regulated supply is filtered using two capacitors C30 and C32 (0.1 µF, 50 v) and one electrolytic capacitor C34 (220 µF, 35 v). The filtered 5 volt signal is supplied to pins 3, 4 and 16 on opto-coupler U1 and pin 3 on inverter U52 (common anode single digit display). Based upon the settings of toggle switches SW10, SW20 and SW30 associated with a dip switch C of the remote unit 40, the binary signals generated by switches SWM1, SWM2 and SWM3 control the flash modes of the circuitry 32, 32 and the display of a flash mode number on a digital display D of the remote unit 40. Beeper 49 and LED sequential operation display D (including LED1 through LED6) of the remote unit 40 operate on 12 volts supplied by the ACCESSORY circuit 68. LED1 through LED6 of display D and beeper 49 operate only when 12 volt ACCESSORY power is supplied to the circuitry 42, and negative signals are generated by inverters U5 in circuitry 32. All flash modes and flash speed can be selected by adjusting the positions of the dip switches C when the 12 volt ACCESSORY power 68 is no longer supplied to the unit 40. Dip switches C include switches SW10, SW20, SW30, SW40 and SW50.

INSTALLATION INSTRUCTIONS FOR SYSTEM 30 REMOTE UNIT 40 TOOLS AND SUPPLIES REQUIRED

To install the circuitry 32 of System 30, the following tools and supplies are required: #1 standard/#2 Phillips screw drivers, wire cutters/strippers, multimeter, soldering iron, solder w/rosin core, heat gun, heat shrink, and wire ties.

The circuitry 32 is designed for 12 volt negative ground systems only. Use 1157 (or related) 12 V bulbs only. Connect only one bulb per output. The fuse 111 must be used in +12 volt BUSS 60 wire at battery 62 terminal. Solder and heat shrink insulate all spliced connections. Do not mount the circuitry 32 in an engine compartment.

Due to variations of wiring configurations in different makes and models of automobiles, installation should be performed by an experienced automotive technician. Refer to original wiring diagram for the specific year, make and model of automobile. Also refer to typical wiring diagram for installation of the control circuitry 32 and remote control unit 40. (see FIG. 7).

STEP 1: BRAKE SIGNAL INPUT

If the car in which the control circuitry 32 is being installed has separate brake and rear turn signal lights, go on to step 2. If the car has brake and rear turn signal lights in the same circuit, please continue with Step 1.

On the brake pedal switch SW5, there are two terminals. A first terminal has a constant 12 volt supply. The second terminal is connected to a switched 12 volt supply. This second terminal supplies 12 volts to the turn signal switch SW3, and a cruise control unit (not shown) when brakes are applied. Disconnect the turn signal switch SW3 from brake switch SW5. Make sure cruise control is still connected. Connect a new wire to the switched 12 volt terminal on brake switch SW5. Run this new wire to the trunk area. This wire is the brake signal input to the control circuitry 32. Label this wire BRAKE.

The brake switch SW5 must be connected to cruise control for automatic shut off. Skip to step 3.

STEP 2: BRAKE SIGNAL INPUT 84

Locate a wire 84 on the wiring harness at the tail light assembly that supplies +12 volts when brakes are applied. Check the voltage and current associated with this wire with the multimeter. After determining which wire 84 supplies the positive 12 volts when the brakes are applied, disconnect that wire from all tail lights. This wire 84 is the BRAKE signal input to the control circuitry 32. Label this wire BRAKE. Continue to step 3.

STEP 3: TURN SIGNAL INPUTS 52, 54

A) The turn signal flasher (not shown) is typically located inside or under the dash. After locating the turn signal flasher, notice it is plugged into a connector with either two or three wires on it. Engage turn signal switch SW3 (left or right terminals 52, 54). The flasher should be clicking. Using the multimeter, check one terminal 52, 54 at a time for positive 12 volts.

One terminal has a constant +12 volts as long as the turn signal switch SW3 is engaged with that terminal. One of the other wires has a pulsing positive 12 volts. Disengage turn signal switch SW3. Now disconnect the flasher from the connector, and replace it with a jumper wire to the two wires 52, 54 that were just tested.

B) Engage turn signal switch SW3 to left turn. On the wiring harness at the left tail light socket, check wires for +12 volts using the multimeter. After determining which wire is supplying +12 volts, disengage turn switch SW3 from that wire such that this wire no longer has +12 volts supplied thereto. Cut this wire from the tail socket. The wire that has been removed from the light socket is now the LEFT signal input 52 to the control circuitry 32. Label this wire 52 LEFT.

C) Repeat all instructions in step 3(B) for right turn input 54. Remember to engage turn switch SW3 to right and check wire 54 at right tail light. Label this wire RIGHT.

STEP 4: RUNNING LIGHT INPUT 56

Turn on running lights LS, RS (it is not necessary to turn on head lights LF, RF). After running lights LS, RS are on, use the multimeter to check for +12 volts in the wiring harness at the tail lights. After determining which wire 56 has positive 12 volts, turn off running light switch SW4, and check the same wire again. This wire 56 should no longer have 12 volts supplied. Do not disconnect this wire 56 from the wiring harness. Tap off from this wire, and connect a new wire, this wire is the RUNNING LIGHT signal input 56 to the control circuitry 32. Label this wire RUNNING LIGHT.

STEP 5: ROUTING INPUT WIRES AND MOUNTING THE CONTROL CIRCUITRY 32

Now that all input wires 52, 54, 56, 84 are designated, splice extension wires as needed using solder and heat shrink. Remember to label each wire: Brake, Left, Right, Running Light.

FIG. 11 shows the preferred embodiment of a housing H in which the control circuitry 32 is disposed. The housing H includes four mounting tabs M (two of which are shown in FIG. 11) that are used to secure the housing H to the vehicle V" by inserting screws through openings O formed in the tabs M. Route all wires to driver side of trunk, behind the back seat. Mount the control circuitry housing H in this area. It is necessary to secure all four mounting tabs M associated with the housing H with screws (not showing).

STEP 6: ROUTING OUTPUT WIRES 90, 92, 94, 96, 120, 122, 124, 126, 128, 130 TO LIGHTS

Refer to FIGS. 7–9 for location of lights to be wired.

Route wires from the following lights to the control circuitry 32. Label wires as follows: L1 (Output 124), L2 (Output 122), L3 (Output 120), R1 (Output 126), R2 (Output 130), R3 (Output 128), LF (Output 90), RF (Output 92). These eight lights all have dual filaments. It is necessary to determine (for each light), which wire supplies positive 12 volts to the HIGH (bright) filament and disconnect it. From each light socket splice an extension wire to the HIGH filament wire using solder and heat shrink. Cut all wires to proper lengths to reach the control circuitry 32. Label each wire.

The interior turn signal indicators Li and Ri in the dash can be wired to outputs 90 and 92 (corresponding to bulbs LF and RF, respectively) from the control circuitry 32. If the remote unit 40 is used, rewiring turn signal indicators may not be desirable. See "Remote Control Unit 40 Controls and Functions" section below.

The last two lights to wire are bulbs LS and RS. These are single filament lights. There are two wires on each of these light sockets. After determining which wire is negative and which is positive, disconnect the positive wire and splice an extension wire to the positive wire going to each light socket using solder and heat shrink. Cut extension wires to proper lengths to reach the control circuitry. Label these wires LS (output 94) and RS (Output 96).

STEP 7: ROUTING +12 v BUSS 60 AND GROUND

Run the cut end of a heavy gauge wire 60 (preferably having a red color), extending from the control circuitry 32 (in trunk), to the battery 62. Do not connect this wire yet. It is important to leave the two-pin connector end of the wire 60 in the trunk area.

The last wire to run to the control circuitry 32 is a GROUND wire 97. This connection can be made from any part of the chassis/frame in the trunk area as long as it is a good clean solid connection. After connecting the GROUND wire 97 to the frame, run it to the location of the control circuitry. Label this wire 97 "GROUND".

STEP 8: SOLDER CONNECTIONS AT THE CONTROL CIRCUITRY 32

Now solder all 15 wires (that have been routed to the trunk area) to the 15 pin FEMALE connector wire ends. Below on the left are all routed wires and on the right are all coded wires from the 15 pin FEMALE connector. The preferred wire colors also are provided. Solder and heat shrink all of these connections accordingly.

|  | WIRE COLOR | 15 PIN FEMALE CONN. PIN # |
|---|---|---|
| INPUTS |  |  |
| 52 (LEFT) | WHITE | 14 |
| 54 (RIGHT) | RED | 6 |
| 84 (BRAKE) | BLUE | 8 |
| 56 (RUNNING LIGHTS) | ORANGE | 7 |
| OUTPUTS |  |  |
| 90 (LF) | GREEN | 13 |
| 92 (RF) | WHITE/blk | 12 |
| 94 (LS) | BLACK/wht | 10 |
| 96 (RS) | ORANGE/blk | 11 |
| 124 (L1) | RED/wht | 2 |
| 122 (L2) | BLUE/wht | 1 |
| 120 (L3) | GREEN/wht | 9 |
| 126 (R1) | RED/blk | 3 |
| 128 (R2) | BLUE/blk | 4 |
| 130 (R3) | GREEN/blk | 5 |
| 97 (CHASSIS GROUND) | BLACK | 15 |

Double check all connections for proper arrangement. Plug the FEMALE connector into MAIN connector port on the control circuitry 32. At the battery 62, solder and heat shrink heavy wire 60 to fuse holder. Connect the other wire from the fuse holder to the POSITIVE POST on the battery 62. Plug opposite end of wire 60 into the control circuitry 32.

Solder and heat shrink the fuse 111 holder as close to the battery 62 as possible. Secure all connectors with screws.

STEP 9: INSTALLING THE REMOTE UNIT 40

FIG. 12 illustrates a preferred housing H' in which the remote control circuitry 42 is disposed. As discussed below, the housing H' includes a digital display D for showing which sequential flashing mode is selected (0–7), and sequential indicators (LEDs 1–6 in FIG. 3) indicating whether the front and/or rear turn signals are illuminated.

The remote control unit 40 is mounted on, under or in the dash of the vehicle V". The display D preferably is visible from the dash. Connect the wire 68 (preferably red)to the+12 v ACCESSORY circuit. Connect a wire 69) preferably black) to ground. Run the cut end of the remote control unit cable from the dash to the control circuitry 32. Solder and heat shrink all connections of remote control unit cable (in trunk to connect the remote unit 40 to the control circuitry 32) to the 15 pin MALE connector wire ends, color for color. Plug the MALE connector into REMOTE port on control circuitry 32 and connector on other end in it remote control unit 40.

Now the control circuitry 32 and remote control unit 40 are installed and ready to operate. If the inside turn signal indicators Li and Ri in the dash have not been rewired, they will light steady and will not flash when used. This is normal due to bypassing the flasher element with jumper wire. To rewire refer to step 6.

If the remote control unit 40 is used, it is necessary to position all switches on the control circuitry 32 to the up position.

REMOTE CONTROL UNIT 40 CONTROLS AND FUNCTIONS

As shown in FIG. 10, the remote control unit 40 has five control switches SW10, SW20, SW30, SW40 (SP) and SW50 (BP). The switch SW40 controls flash rate or speed, the switch SW50 controls beeper 49 volume and the switches SW10, SW20, SW30 control the sequential flash modes. In the remote unit 40 (and in the control circuits 10 and 20) the beeper 49 (or beeper 80) is activated when the left or right turn signals are flashing. Input signals of the beeper 49 are derived from the output of the HEX inverter drivers 45. The digital display D is also provided in the housing H' to display the selected flash mode (0–7). The display D associated with the remote system 40 also gives real time visual indications of main unit 32 operations with front and rear turn signal indicators (LEDs 1–6). All tail light indicators L1, L2, L3, R1, R2, R3 and numerical display preferably illuminate red.

Below is a flash flow table showing flash mode sequences for the selected indicator. All examples are shown in right turn indicators R1, R2, R3. This flow table is set forth for illustrative purposes to show eight different illumination patterns (0–7) for indicators R1, R2, R3. For example, a pattern such as "X00 XX0" indicates that R1=X =on, R2=O=off, and R3=O=off at one instant in time, and then at the next moment in time R1=X=on, R2=X=on, and R3=O= off. The time intervals for each flash mode varies. The control circuitry 32 does not feature modes designated by *, unless the circuitry 32 is adapted to feature all 8 flash modes (0 through 7).

FLASH TABLE

Each group of lights represents R1, R2, R3
X = LIGHT ON
0 = LIGHT OFF

| FLASH MODE | R1 R2 R3 | R1 R2 R3 | R1 R2 R3 | R1 R2 R3 | R1 R2 R3 | R1 R2 R3 | R1 R2 R3 | R1 R2 R3 |
|---|---|---|---|---|---|---|---|---|
| 0-STANDARD | XXX | 000 | XXX | 000 | XXX | 000 | XXX | 000 |
| 1-SINGLE | X00 | 0X0 | 00X | 000 | X00 | 0X0 | 00X | 000 |
| *2-DOUBLE | X00 | XX0 | 0XX | 00X | 000 | X00 | XX0 | 0XX |
| 3-TRIPLE | X00 | XX0 | XXX | 0XX | 00X | 000 | X00 | XX0 |
| 4-REBOUND | X00 | XX0 | XXX | XX0 | X00 | 000 | X00 | XX0 |
| *5-DEMO1 | X00 | 0X0 | 00X | 000 | X00 | XX0 | 0XX | 00X |
| 6-COUGAR | X00 | XX0 | XXX | 000 | X00 | XX0 | XXX | 000 |
| *7-DEMO2 | X00 | 0X0 | 00X | 0X0 | X00 | 000 | X00 | XX0 |

*Not featured with standard control circuitry 32 (unless expanded to provide 8 flash modes)

FIG. 13 sets forth a flash table for system 30 showing the outputs of pins 23, 24 and 25 of the microprocessor U4, which control energization of indicators R1, R3, and R2, respectively. Similar output signals are generated by the microprocessor U4 for indicators L1, L3 and L2. These output signals are based upon the positioning of toggle switches SWM1, SWM2 and SWM3.

SELECTING FLASH MODES WITHOUT THE REMOTE CONTROL UNIT 40:

All flash modes are selected by four dip switches SWM1, SWM2, SWM3, SWSP extending from the housing H as shown in FIG. 4. These dip switches correspond to those shown in FIG. 3. These switches SWM1, SWM2, SWM3, SWSP are preferably either single pole, double throw or single pole, single throw switches. As indicated in FIGS. 3 and 4, switch SWM1 controls mode 1, switch SWM2 controls mode 2, and switch SWM3 controls mode 3. The switch SWSP controls speed (up=fast/down=slow). Below are all mode switch configurations.

| POSITIONING OF DIP SWITCHES TO SELECT FLASH MODE | | | | |
|---|---|---|---|---|
| MODE | Switch SWM1 | Switch SWM2 | Switch SWM3 | Switch SWSP |
| 0-STANDARD | DN | DN | DN | SPD-up/dn |
| 1-SINGLE | UP | DN | DN | SPD-up/dn |
| *2-DOUBLE | DN | UP | DN | SPD-up/dn |
| 3-TRIPLE | UP | UP | DN | SPD-up/dn |
| 4-REBOUND | DN | DN | UP | SPD-up/dn |
| *5-"DEMO 1" | UP | DN | UP | SPD-up/dn |
| 6-COUGAR | DN | UP | UP | SPD-up/dn |
| *7-"DEMO 2" | UP | UP | UP | SPD-up/dn |

AUTO FLASH FUNCTIONS

In one embodiment of the present invention, if the turn switch lever is momentarily actuated without latching, the turn signal lights will automatically flash 6 times in slow speed and 12 times in fast speed. Auto flash can be canceled by briefly applying brakes or holding turn switch lever for 2 or more flashes.

| CONTROL CIRCUITRY 32 SPECIFICATIONS: | |
|---|---|
| POWER SOURCE | DC 12 VOLT |
| GROUNDING SYSTEM | NEGATIVE |
| MEMORY CURRENT DRAW | .08 AMPS |
| MAX. CURRENT DRAW | 22.5 AMPS |
| MAX. POWER OUTPUT | 27 WATTS × 10 |
| FUSE | 25 AMP FAST BLOW |

| | H | W | D |
|---|---|---|---|
| HOUSING H DIMENSIONS | 1-½" | 6-¼" | 2-⅞" |
| WEIGHT | 1.5 LBS. | | |

ALL COMMAND INPUTS ARE +12 VOLTS: LF, RF, LS, RS, L1, L2, L3, R1, R2, R3

| REMOTE CONTROL UNIT 40 SPECIFICATIONS: | |
|---|---|
| POWER SOURCE | DC 12 VOLT |
| GROUNDING SYSTEM | NEGATIVE |
| MAX. CURRENT DRAW | 1.8 AMPS |
| FUSE | 3 AMP FAST BLOW |

| | H | W | D |
|---|---|---|---|
| HOUSING H' DIMENSIONS | 2" | 3-⅞" | 1-¾" |
| WEIGHT | 0.7 lbs. | | |

TROUBLE SHOOTING

If the control circuitry 32 does not operate, check all connections and the 25 amp fuse 111. If the circuitry 32 operates erratically, reset the control circuitry 32 by removing the 25 amp fuse 111 for 8 seconds and check all connections. If the remote control unit 40 does not operate, check to see if ACCESSORY power is provided, examine all connections and the 3 amp fuse, and be sure all switches B on the control circuitry 32 are in the "UP" position.

The foregoing description is set forth only for illustrative purposes only and is not meant to be limiting. Numerous variations, within the scope of the appended claims will be apparent to those skilled in the art in light of the foregoing description and accompanying drawings.

I claim:

1. A vehicle turn signal control system for controlling left and right turn signal indicators, comprising:

a turn signal switch lever operably connected to a turn signal switch for activating the left turn signal indicators or the right turn signal indicators to flash for a predetermined number of pulses when the lever is moved into an intermediate unlatched position for a predefined first time interval;

a dip switch including at least two dual position toggle switches for defining the predetermined number of pulses emitted by the indicators when the switch lever is moved into the intermediate position for the predefined time interval; and control circuitry for selectively energizing the right or left turn signal indicators based upon the position of the turn signal switch lever and position of the toggle switches.

2. The vehicle turn signal control system of claim 1, wherein the first predefined time interval is less than a time interval corresponding to one flash of the indicators.

3. The vehicle turn signal control system of claim 1, wherein said turn signal switch transmits input signals to said control circuitry indicating whether the left or right turn signals are to be energized by the system.

4. The vehicle turn signal control system of claim 3, wherein said control circuitry includes a microprocessing device for processing input signals received from the turn signal switch, and transmitting pulse signals to said turn signal indicators based upon the input signals from turn signal switch and the configuration of the toggle switches.

5. The vehicle turn signal control system of claim 1, wherein said predetermined number of pulses transmitted to the turn signal indicators is based upon the number of times the turn signal lever is consecutively moved into the intermediate position for the predefined first time interval.

6. The vehicle turn signal control system of claim 5, wherein said switch lever activates turn signal indicators located on opposite sides of the vehicle to consecutively flash for the predetermined number of pulses when the lever is consecutively moved into the corresponding intermediate positions; said control circuitry generating a delay period between consecutive transmissions of the predetermined number of pulses to the left and right turn signal indicators.

7. The vehicle turn signal control system of claim 1, wherein said control circuitry terminates the transmission of pulses to the turn signal indicators when the turn signal switch lever is moved into the intermediate unlatched position for a second time interval having a longer duration than the first time interval.

8. The vehicle turn signal control system of claim 1, wherein said turn signal indicators includes a first set of bulbs located on a right rear side of the vehicle and a second set of bulbs located on a left rear side of the vehicle.

9. The vehicle turn signal control system of claim 8, wherein said first or second set of bulbs is activated to flash in a predefined sequence for the predetermined number of pulses based upon the positioning of the toggle switches.

10. The vehicle turn signal control system of claim 9, further including a remote control circuitry operable connected to said control circuitry, said bulbs flashing in the predetermined sequence at an adjustable speed based upon the positioning of a plurality of dual position toggle switches associated with said remote control circuitry.

11. A vehicle turn signal control system for use in combination with a vehicle having a pair of front turn signal indicators disposed on opposite sides of a front portion of the vehicle, a pair of rear turn signal indicators disposed on opposite sides of a rear portion of the vehicle, and a manually actuated turn signal lever operably connected to a turn signal switch for alternately operating turn signals on one side of the vehicle, said turn signal lever having a deactivated position when the turn signal indicators are deenergized, an intermediate unlatched position for energizing the indicators on one side of the vehicle, and a latched position for energizing the indicators on one side of the vehicle until an operator steers the car in an indicated direction, said vehicle turn signal control system comprising control circuitry for selectively energizing the turn signal indicators on one side of the vehicle when said turn signal lever is maintained in the intermediate position for a predefined time interval, said control circuitry including at least two dual position toggle switches, each of said toggle switches being selectively positioned in one of two states to define one of a plurality of preset flash cycles for said turn signal indicators upon actuation of the control circuitry.

12. The turn signal control system of claim 11, wherein the predefined time interval in which the lever is maintained in its intermediate position is less than a time duration corresponding to one flash of the turn signal indicators.

13. The turn signal control system of claim 11, wherein the control circuitry triggers the indicators to flash on one side of the vehicle for a predetermined sequence based upon the position of the toggle switches.

14. The turn signal control system of claim 11, further including a pair of side marker turn signal indicators disposed on opposite sides of the vehicle in the vicinity of the front portion; said control circuitry controlling selectively energizing the side marker indicators on one side of the vehicle to flash for the preset flash cycle when the turn signal lever is moved into the intermediate position for the predefined time interval.

* * * * *

UNITED STATES PATENT AND TRADEMARK OFFICE
CERTIFICATE OF CORRECTION

PATENT NO. : 5,790,017
DATED : August 4, 1998
INVENTOR(S) : Paul J. Berryhill

It is certified that error appears in the above-identified patent and that said Letters Patent is hereby corrected as shown below:

On the title page, please substitute the ABSTRACT as shown with the following:

"A vehicle turn signal indicator control system for left and right turn signals in which the turn signal lever has three posiitions, on, off and intermediate. The system has circuitry that controls the number of pulses flashed by the left or right indicator lights when the signal lever is in intrmediate position for a lesser amount of time than one output flash. The system uses the existing turn signal lever, a dip switch with at least two dual position toggle switches and control circuitry for energizing the signal indicators based on the position and duration of the turn signal lever and the toggle switches."

Signed and Sealed this

Twentieth Day of February, 2001

Attest:

NICHOLAS P. GODICI

*Attesting Officer*  *Acting Director of the United States Patent and Trademark Office*